US007059089B1

(12) United States Patent
Fontaine

(10) Patent No.: US 7,059,089 B1
(45) Date of Patent: Jun. 13, 2006

(54) FLEXIBLE SHEET MATERIALS FOR TENSIONED STRUCTURES, A METHOD OF MAKING SUCH MATERIALS, AND TENSIONED FALSE CEILINGS COMPRISING SUCH MATERIALS

(75) Inventor: Marc Fontaine, Haubourdin (FR)

(73) Assignee: NEWMAT, SA, Haubourdin (FR)

( * ) Notice: Subject to any disclaimer, the term of this patent is extended or adjusted under 35 U.S.C. 154(b) by 0 days.

(21) Appl. No.: 09/979,245

(22) PCT Filed: Mar. 20, 2000

(86) PCT No.: PCT/FR00/00682

§ 371 (c)(1),
(2), (4) Date: Apr. 11, 2002

(87) PCT Pub. No.: WO01/71116

PCT Pub. Date: Sep. 27, 2001

(51) Int. Cl.
*B32B 27/00* (2006.01)

(52) U.S. Cl. .......................... 52/144; 52/222; 428/141; 428/156

(58) Field of Classification Search ................ 428/141, 428/143, 147, 156; 52/145, 144, 222
See application file for complete search history.

(56) References Cited

U.S. PATENT DOCUMENTS 1,554,179 A * 9/1925 Trader ........................ 181/293
2,990,027 A * 6/1961 Sabine ........................ 181/291
3,087,577 A * 4/1963 Prestia ........................ 428/138
3,126,978 A * 3/1964 Bergstrom .................. 181/290
3,649,430 A * 3/1972 Lewis et al. ................ 428/138
3,712,846 A * 1/1973 Daniels et al. .............. 428/141
3,782,495 A 1/1974 Nassof
3,965,906 A * 6/1976 Karami ........................ 604/366
4,055,180 A * 10/1977 Karami ........................ 604/368
4,083,157 A 4/1978 Anthonioz
4,219,376 A * 8/1980 Roman ........................ 156/209
4,310,370 A * 1/1982 Arai et al. .................. 156/220
4,343,848 A 8/1982 Leonard, Jr.
4,485,599 A * 12/1984 Perradin ...................... 52/222
5,085,340 A 2/1992 Doxey et al.
6,720,069 B1 * 4/2004 Murakami et al. ....... 428/319.3

FOREIGN PATENT DOCUMENTS

| | | |
|---|---|---|
| DE | 197 54 107 | 2/1999 |
| EP | 0043466 | 1/1982 |
| EP | 0089905 | 9/1983 |
| EP | 0215715 | 3/1987 |
| EP | 0281468 | 9/1988 |
| EP | 0338925 | 10/1989 |
| EP | 0 399 935 | 11/1990 |
| EP | 0588748 | 3/1994 |
| EP | 0643180 | 3/1995 |
| EP | 0652339 | 5/1995 |
| EP | 0504530 | 10/1995 |
| FR | 2524922 | 9/1921 |
| FR | 2531012 | 1/1922 |
| FR | 2537112 | 5/1922 |

(Continued)

*Primary Examiner*—Naoko Slack
*Assistant Examiner*—Basil Katcheves
(74) *Attorney, Agent, or Firm*—Ladas & Parry LLP

(57) ABSTRACT

A flexible sheet material of thickness less than half a millimeter for making tensioned structures such as false ceilings, in particular, the material including microprojections formed by displacing the material from which it is made, said material presenting an acoustic absorption coefficient which is higher than that of the same material without said projections.

3 Claims, 11 Drawing Sheets

FOREIGN PATENT DOCUMENTS

| | | |
|---|---|---|
| FR | 1287077 | 7/1962 |
| FR | 1303930 | 9/1962 |
| FR | 1515260 | 6/1968 |
| FR | 1475446 | 10/1968 |
| FR | 2002261 | 12/1970 |
| FR | 2 088 433 | 1/1972 |
| FR | 2145147 | 2/1973 |
| FR | 2078579 | 7/1973 |
| FR | 2202997 | 5/1974 |
| FR | 2106407 | 7/1974 |
| FR | 2175854 | 7/1974 |
| FR | 2270407 | 12/1975 |
| FR | 2310450 | 4/1978 |
| FR | 2486127 | 1/1982 |
| FR | 2475093 | 10/1983 |
| FR | 2523622 | 12/1984 |
| FR | 2552473 | 3/1985 |
| FR | 2561690 | 9/1985 |
| FR | 2592416 | 7/1987 |
| FR | 2597906 | 10/1987 |
| FR | 2587392 | 12/1987 |
| FR | 2587447 | 12/1987 |
| FR | 2619531 | 2/1989 |
| FR | 2623540 | 5/1989 |
| FR | 2611779 | 6/1989 |
| FR | 2624167 | 6/1989 |
| FR | 2627207 | 8/1989 |
| FR | 2630476 | 10/1989 |
| FR | 2645135 | 10/1990 |
| FR | 2658849 | 9/1992 |
| FR | 2685036 | 6/1993 |
| FR | 2688849 | 9/1993 |
| FR | 2691193 | 11/1993 |
| FR | 2692302 | 12/1993 |
| FR | 2695670 | 3/1994 |
| FR | 2699209 | 6/1994 |
| FR | 2699211 | 6/1994 |
| FR | 2699613 | 6/1994 |
| FR | 2703711 | 10/1994 |
| FR | 2707708 | 1/1995 |
| FR | 2712006 | 5/1995 |
| FR | 2712325 | 5/1995 |
| FR | 2727711 | 6/1996 |
| FR | 2734296 | 11/1996 |
| FR | 2736615 | 9/1997 |
| FR | 2751682 | 1/1998 |
| FR | 2756600 | 6/1998 |
| FR | 2767851 | 3/1999 |
| WO | WO9218722 | 10/1992 |
| WO | WO9412741 | 6/1994 |

* cited by examiner

| 1/3 Oct Freq Hz | 100 | 125 | 160 | 200 | 250 | 315 | 400 | 500 | 630 | 800 | 1k | 1,25k | 1,6k | 2k | 2,5k | 3,2k | 4k | 5k | NRC |
|---|---|---|---|---|---|---|---|---|---|---|---|---|---|---|---|---|---|---|---|
| 0 Absorption Coefficient | 0.05 | 0.07 | 0.12 | 0.21 | 0.30 | 0.45 | 0.66 | 0.69 | 0.71 | 0.72 | 0.74 | 0.78 | 0.83 | 0.87 | 0.92 | 0.94 | 0.98 | 1.01 | 0.65 |
| SABINS | 3.6 | 5.3 | 8.3 | 15.3 | 21.6 | 32.6 | 47.5 | 49.6 | 50.9 | 52 | 53.3 | 56.4 | 60.1 | 62.6 | 65.9 | 67.7 | 70.2 | 72.5 | (0650) |

| 1/3 Oct Freq Hz | 100 | 125 | 160 | 200 | 250 | 315 | 400 | 500 | 630 | 800 | 1k | 1.25k | 1.6k | 2k | 2.5k | 3.2k | 4k | 5k | NRC |
|---|---|---|---|---|---|---|---|---|---|---|---|---|---|---|---|---|---|---|---|
| 0 Absorption Coefficient | 0.17 | 0.28 | 0.47 | 0.75 | 1.02 | 1.11 | 1.08 | 0.84 | 0.66 | 0.52 | 0.42 | 0.34 | 0.30 | 0.25 | 0.22 | 0.18 | 0.15 | 0.13 | 0.65 |
| SABINS | 12.5 | 20 | 33.8 | 54.3 | 73.5 | 80 | 77.9 | 60.7 | 47.3 | 37.3 | 29.9 | 24.8 | 21.3 | 18.2 | 15.7 | 13.2 | 11 | 9.3 | (0633) |

| 1/3 Oct Freq Hz | 100 | 125 | 160 | 200 | 250 | 315 | 400 | 500 | 630 | 800 | 1k | 1.25k | 1.6k | 2k | 2.5k | 3.2k | 4k | 5k | NRC |
|---|---|---|---|---|---|---|---|---|---|---|---|---|---|---|---|---|---|---|---|
| 0 Absorption Coefficient | 0.09 | 0.14 | 0.24 | 0.34 | 1.02 | 0.70 | 0.87 | 0.69 | 0.52 | 0.39 | 0.30 | 0.25 | 0.28 | 0.31 | 0.25 | 0.21 | 0.18 | 0.18 | 0.45 |
| SABINS | 6.6 | 9.8 | 17.2 | 24.7 | 37.1 | 50.3 | 62.5 | 50 | 37.1 | 29.7 | 21.3 | 18.2 | 19.9 | 22.4 | 17.9 | 14.8 | 13.3 | 13 | |

FLEXIBLE SHEET MATERIALS FOR TENSIONED STRUCTURES, A METHOD OF MAKING SUCH MATERIALS, AND TENSIONED FALSE CEILINGS COMPRISING SUCH MATERIALS

The invention relates to the technical field of relatively thin sheet materials, typically less than half a millimeter thick, used for making under-ceilings, false ceilings, false walls, wall coverings, by putting such sheet materials under tension.

A large number of embodiments of such materials and also the use thereof in tensioned or "stretched" false ceilings are already known in the prior art.

By way of example, reference can be made to the patent applications made in France published under the following numbers: 2 767 851, 2 751 682, 2 734 296, 2 712 006, 2 707 708, 2 703 711, 2 699 211, 2 699 209, 2 695 670, 2 691 193, 2 685 036, 2 645 135, 2 630 476, 2 627 207, 2 624 167, 2 623 540, 2 619 531, 2 597 906, 2 611 779, 2 592 416, 2 587 447, 2 561 690, 2 587 392, 2 552 473, 2 537 112, 2 531 012, 2 524 922, 2 475 093, 2 486 127, 2 523 622, 2 310 450, 2 270 407, 2 202 997, 2 175 854, 2 145 147, 2 106 407, 2 002 261, 1 475 446, 1 303 930, 1 287 077. Reference can also be made, by way of example, to the following documents: U.S. Pat. No. 5,058,340, U.S. Pat. No. 4,083,157, EP-A-643 180, EP-A-652 339, EP-A-588 748, EP-A-504 530, EP-A-338 925, EP-A-281 468, EP-A-215 715, EP-A-089 905, EP-A-043 466, WO-A-94/12741, WO-A-92/18722. Reference can also be made to the following French patent applications stemming from the Applicant: 2 736 615, 2 756 600, 2 727 711, 2 712 325, 2 699 613, 2 695 670, 2 692 302, 2 658 849.

In the prior art, known materials for making tensioned false ceilings or tensioned false walls are usually polymer materials having numerous qualities such as the following in particular: resistance to fire; leakproof against air and also dust or moisture; and ease of cleaning.

False ceilings obtained using such materials can incorporate thermal insulation, spotlamps or various other kinds of lighting, and openings for ventilation or aeration or for sprinklers. Since they can be removed, they also make it possible, where appropriate, to take action in the plenum.

The polymer materials for tensioned ceilings that are known in the prior art can be translucent or opaque, optionally bulk colored, mat, shiny, marbled, frosted, or glazed, and can thus be used both in industrial premises and in hospitals, in public buildings, in laboratories, or in dwellings.

A shiny finish provides a mirror effect which is often used in commercial centers, while a mat finish similar in appearance to plaster is more usual for traditional decoration.

In spite of the numerous advantages that have led to increasing use of prior art tensioned polymer sheet false ceilings and false walls in a variety of environments, they suffer from the major drawback of presenting poor acoustic properties, with the reverberation of sound on such tensioned ceilings being particularly high.

Attenuating sound reverberation on walls and ceilings is a technical problem which, as such, has been known for a long time.

Several technical solutions have been envisaged.

In a first technique, soundproofing panels comprise a perforated plate of metal or plastics material fixed on a support of the mineral wall or polyurethane foam type. Concerning this first technique whereby sound is absorbed passively by fibrous or porous materials, reference can be made by way of example to the following documents: EP-A-013 513, EP-A-023 618, EP-A-246 464, EP-A-524 566, EP-A-605 784, EP-A-652 331, FR-A-2 405 818, FR-A-2 536 444, FR-A-2 544 358, FR-A-2 549 112, FR-A-2 611 776, FR-A-2 611 777, FR-A-2 732 381, U.S. Pat. No. 4,441,580, U.S. Pat. No. 3,948,347. That technique leads to an assembly in which the acoustically absorbent backing is secured to the visible perforated facing. The perforations are intended to allow waves to be attenuated by the acoustically absorbent material which cannot be left visible because it is too fragile, has a surface that is sometimes easily dirtied, and has raw appearance that is unattractive.

In a second technique, the panels used to form walls such as suspended ceilings, for example, are provided with cavities of volume designed to tune them to certain frequency ranges, with said cavities being protected by porous facing. For that second type of technique using Helmholtz resonators, reference can be made for example to the following documents: DE-PS-36 43 481, FR-A-2 463 235.

In a third technique which is used in the field of suspended ceilings, the visible surface of the ceiling panels is embossed or provided with deep cavities or grooves. By way of example, reference can be made to the following documents: FR-A-2 381 142, FR-A-2 523 621, FR-A-2 573 798, WO-A-80/01 183, WO-A-94/24382.

In a fourth technique, honeycomb sheets form absorbing membranes. That technique is expensive, but is sometimes used in recording studios.

None of the technical solutions known in the prior art for improving the sound properties of suspended ceilings or walls is suitable for the particular technique of tensioned walls or ceilings.

A first object of the invention is to provide a flexible sheet material suitable for being used in tensioned structures for decoration, masking, or display purposes, such as false ceilings or false walls, in particular, said material presenting acoustic properties that are greatly improved.

A second object of the invention is to provide a material of the kind mentioned above whose visual appearance remains entirely suited to its use, whether in industrial premises or in hospitals or in public buildings or in recent or historic dwellings.

To these ends, in a first aspect the invention provides a flexible sheet material of thickness less than half a millimeter for making tensioned structures such as false ceilings, in particular, the material including microprojections formed by displacing the material from which it is made, said material presenting an acoustic absorption coefficient which is higher than that of the same material without said projections.

In various embodiments, this material also possesses the following characteristics, possibly in combination:

- the height of the microprojections measured in a direction perpendicular to the plane of said sheet in the vicinity of said microprojections is less than three times the thickness of said sheet;
- the microprojections project on one side only of said sheet;
- each of the microprojections is located at a node of a regular pattern;
- all of the microprojections are located at the nodes of a single pattern, e.g. having a square mesh;
- its microprojections project from both faces of said sheet, each of the microprojections being disposed at a node of a regular pattern, and, where appropriate, all of the microprojections being disposed at the nodes of a single pattern, e.g. a square mesh;

the microprojections are in the form of depressions having a substantially plane end wall connected to an opening via a strip of material of thickness that is smaller than or equal to the thickness of portions of the sheet between the microprojections;

the depressions are circularly symmetrical about respective axes that are substantially perpendicular to their end walls;

the strip of material connecting the end wall of a depression to its opening is discontinuous;

it is provided with microperforations, having openings smaller than four-tenths of a millimeter (0.4 mm);

the material is provided with microperforations, having openings smaller than four-tenths of a millimeter, at least a fraction of the microprojections being provided with said microperforations, said micro-perforations being, where appropriate, likewise disposed between the microprojections;

the microperforations are disposed at the nodes of a pattern;

the microperforations are disposed at the nodes of a pattern identical to the pattern of the micro-projections and offset relative thereto;

the microperforations are obtained by needling or by any other equivalent method;

the microperforations are obtained without removing any material;

the material is selected from the group comprising plastified polyvinyl chlorides, vinylidene chlorides, copolymers of vinyl chloride and vinylidene chloride, and any other equivalent material;

the area occupied by the microprojections lies in the range 0.5% to 10% of the area of said sheet; and the density of the microprojections and/or the microperforations lies in the range 2 to 60 per square centimeter, preferably in the range 15 to 35 per square centimeter, and more particularly in the range 20 to 30 per square centimeter.

In a second aspect, the invention also provides a method of making a sheet of material as presented above, the method comprising a step of needling to displace locally the material constituting the sheet so as to subject it to microperforation in a predetermined pattern. The needling step is performed without any material being removed from the sheet. The needles used in the needling method have a tip diameter of less than one-tenth of a millimeter, for example of the order of four-hundredths of a millimeter. In an implementation, the needling is performed while the sheet of material is subjected to tension of the same order as the tension to which it will be subjected in final use in a tensioned structure.

In a third aspect, the invention provides a false ceiling characterized in that it comprises a sheet of material as presented above, and tensioned relative to support means.

Other objects and advantages of the invention appear from the following description of embodiments, which description is given with reference to the accompanying drawings, in which:

FIGS. 1*a*, 1*b*, 1*c*, 1*d* and 1*e* show various embodiments of a material of the invention for providing a tensioned sheet;

Figure 2:
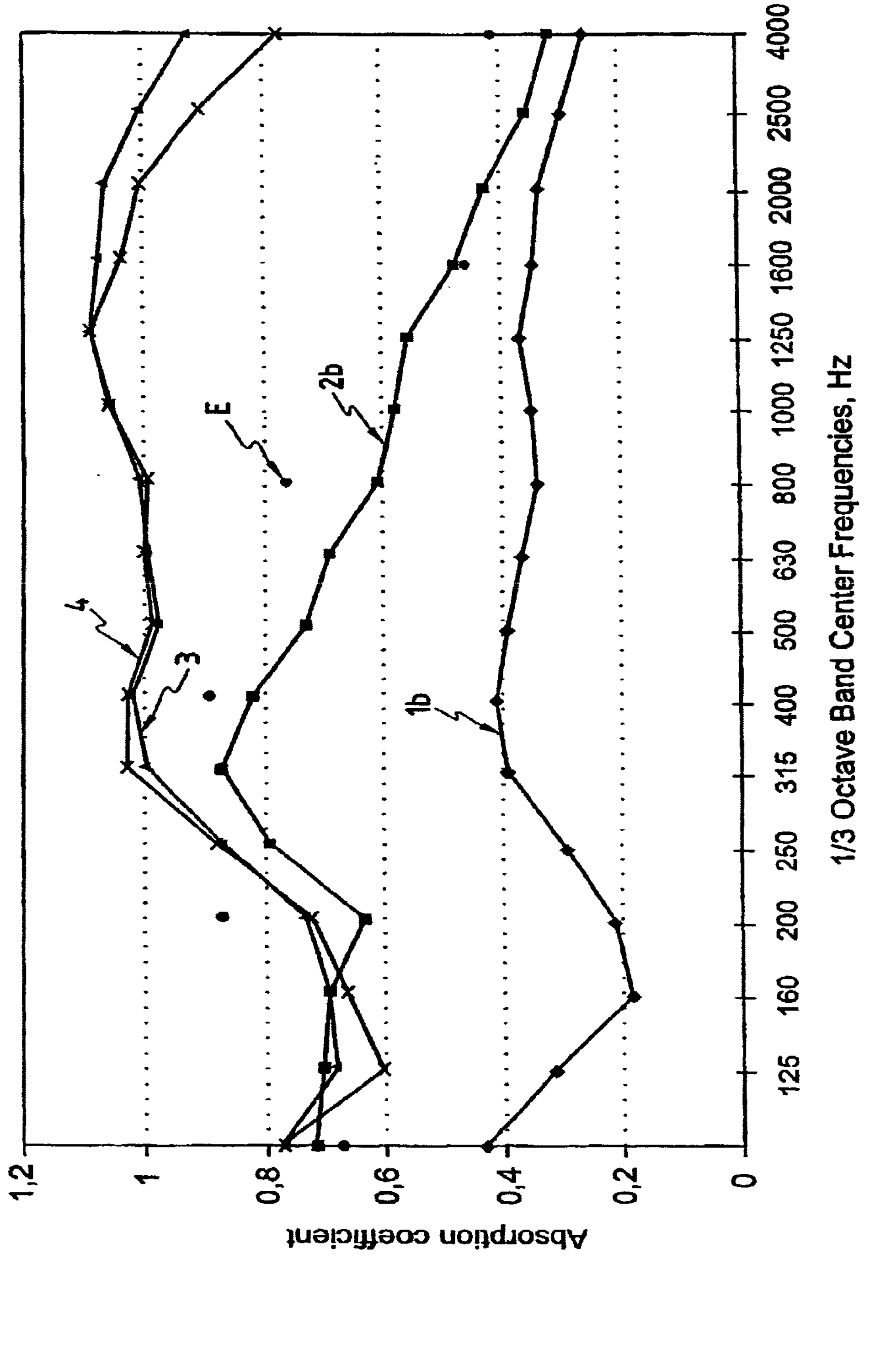
FIG. 2 is a graph showing measured values for the acoustic absorption coefficient as a function of one-third octave band center frequencies under four experimental conditions 1*b*, 2*b*, 3, and 4, and also for a reference sample.
Figure 3:
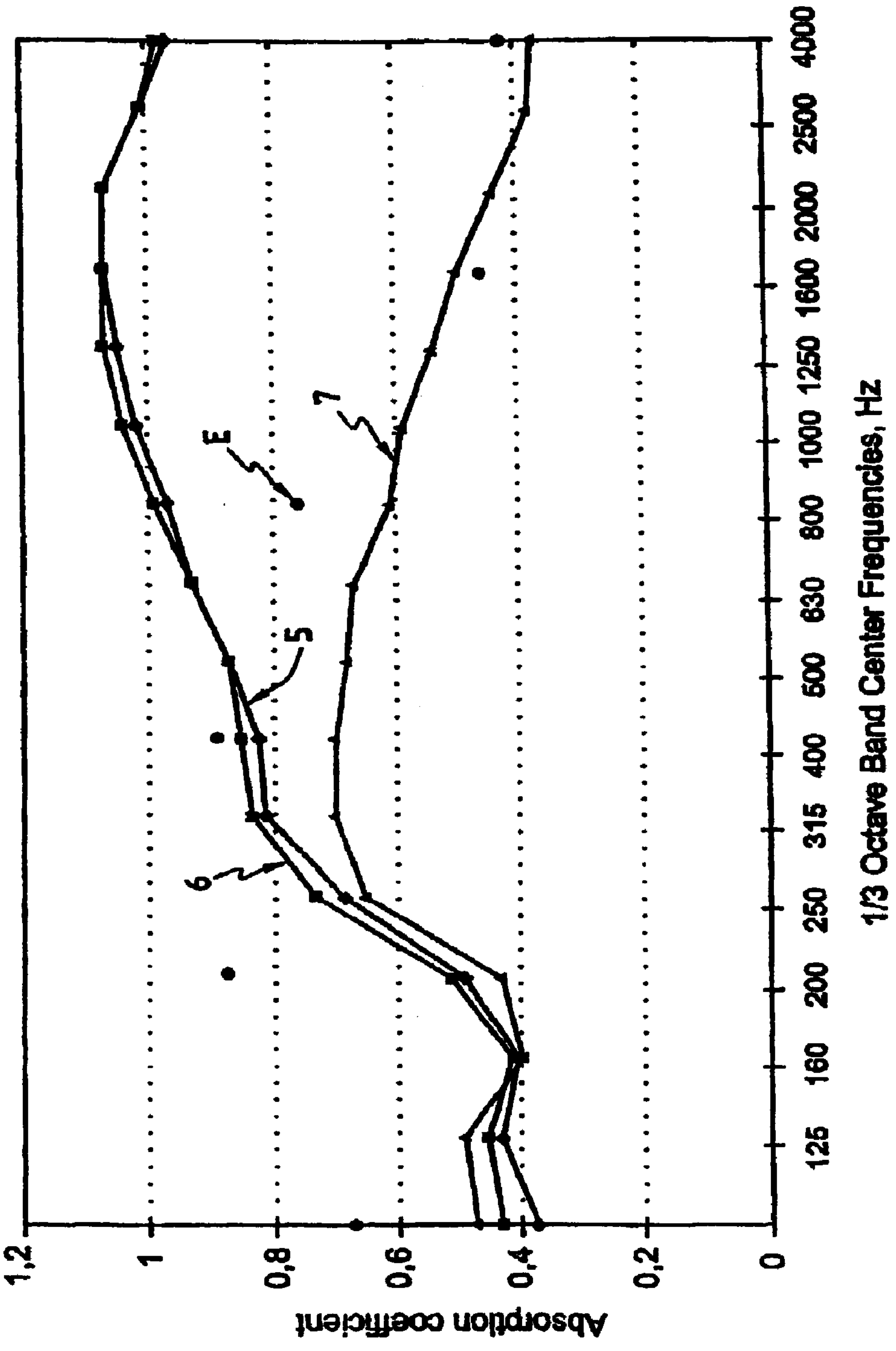
FIG. 3 is a graph analogous to FIG. 2 for experimental conditions 5, 6, and 7.
Figure 4:
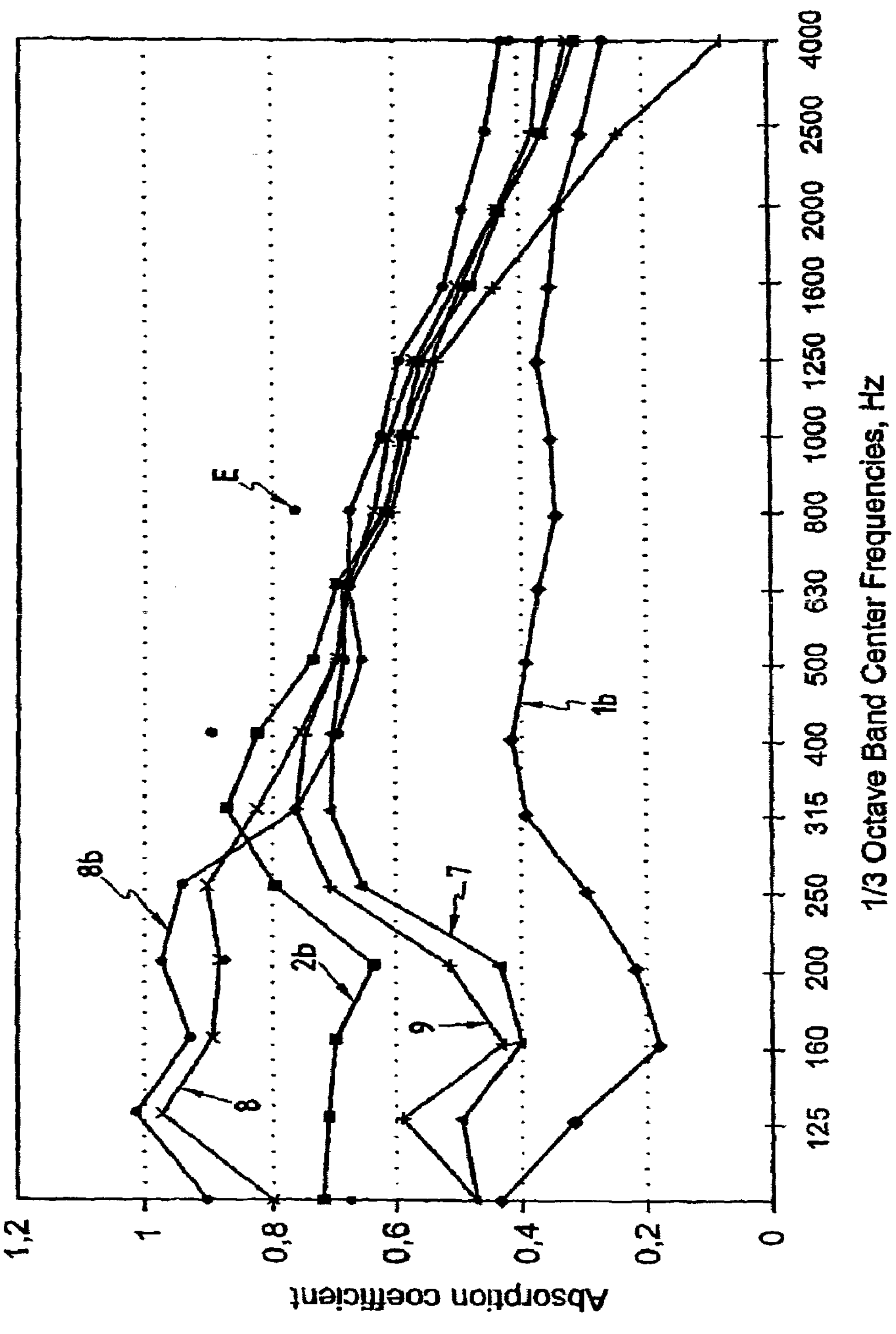
Figure 5:
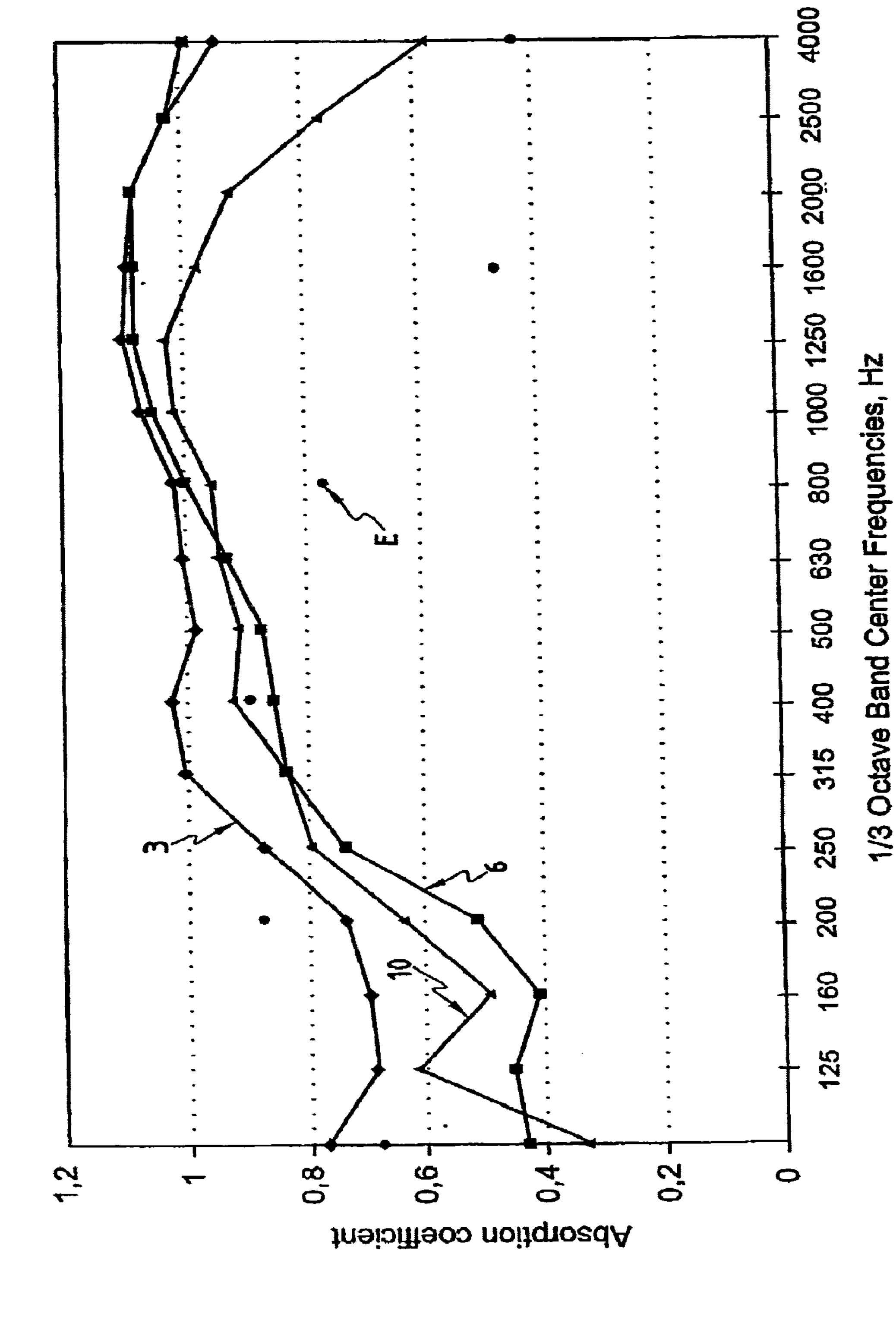
Figure 6:
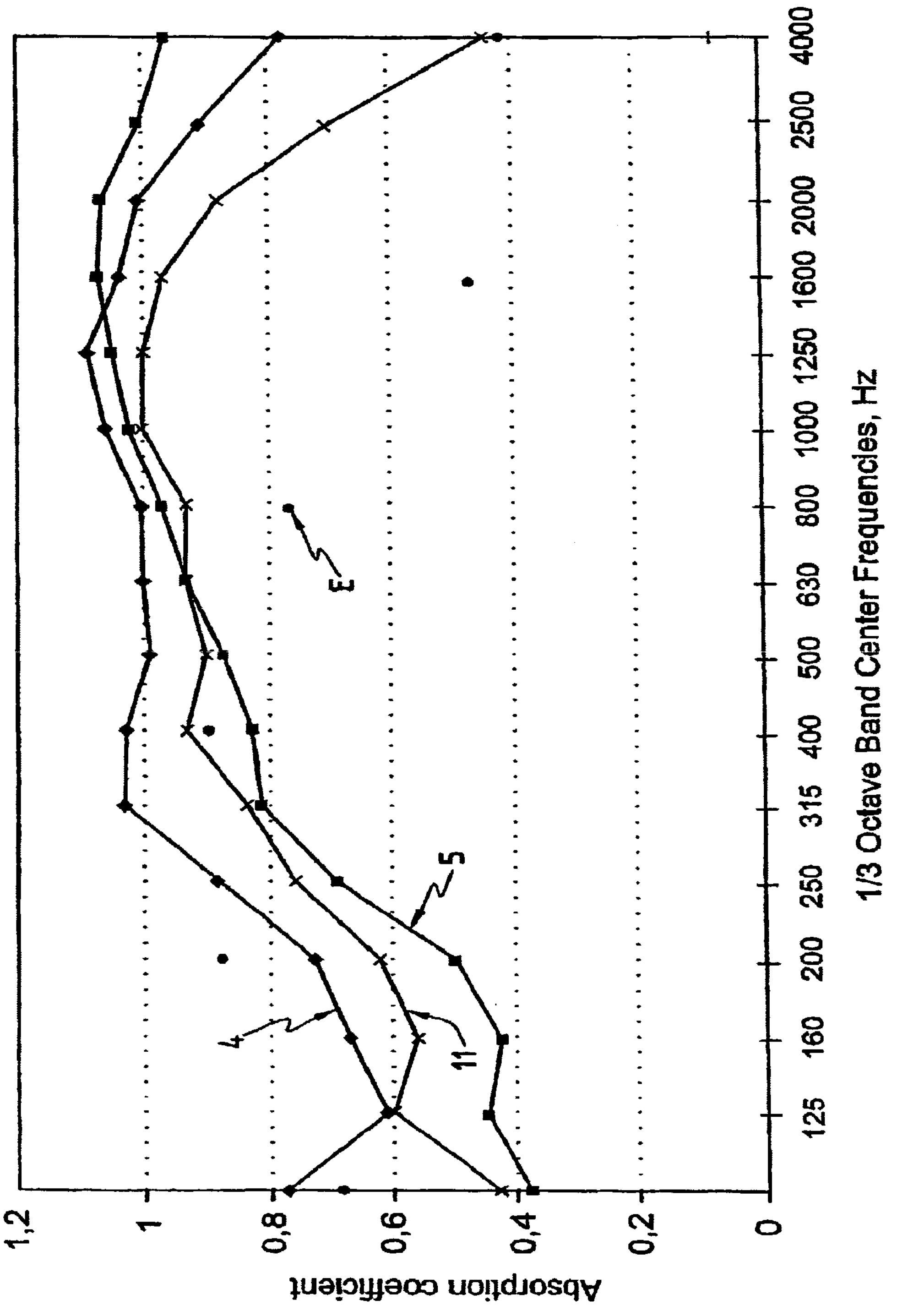
Figure 7:
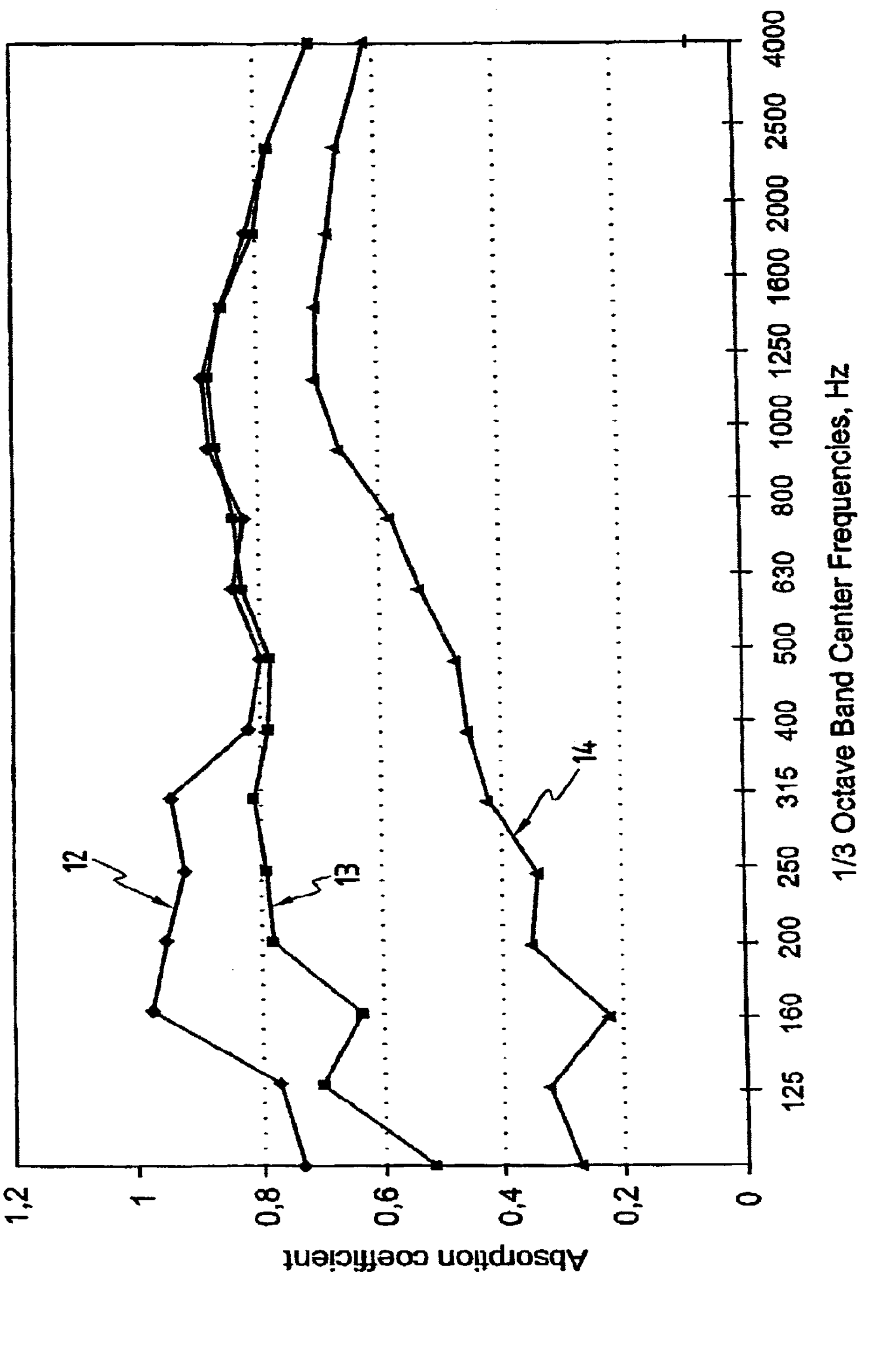
Figure 8:
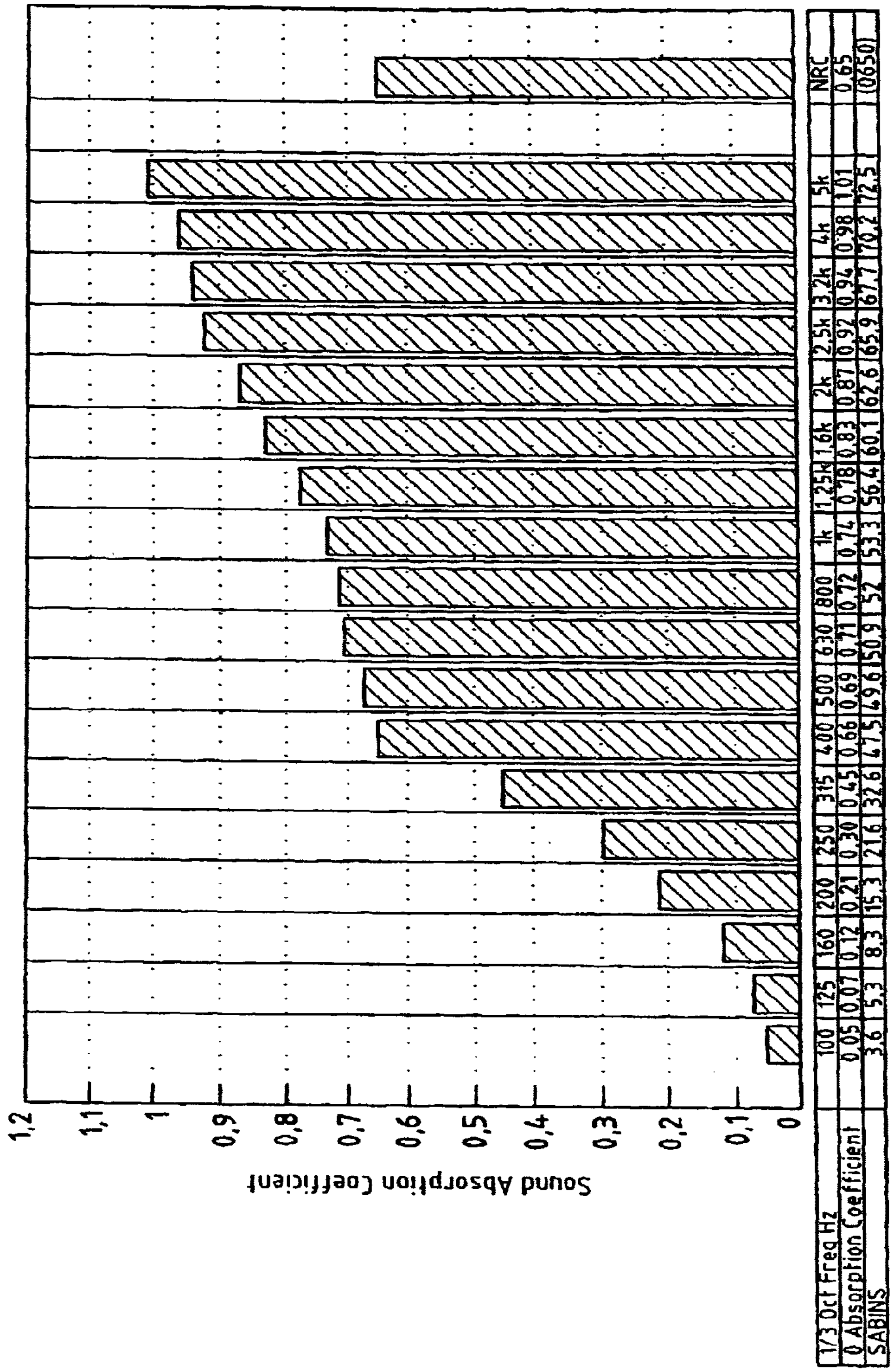
Figure 9:
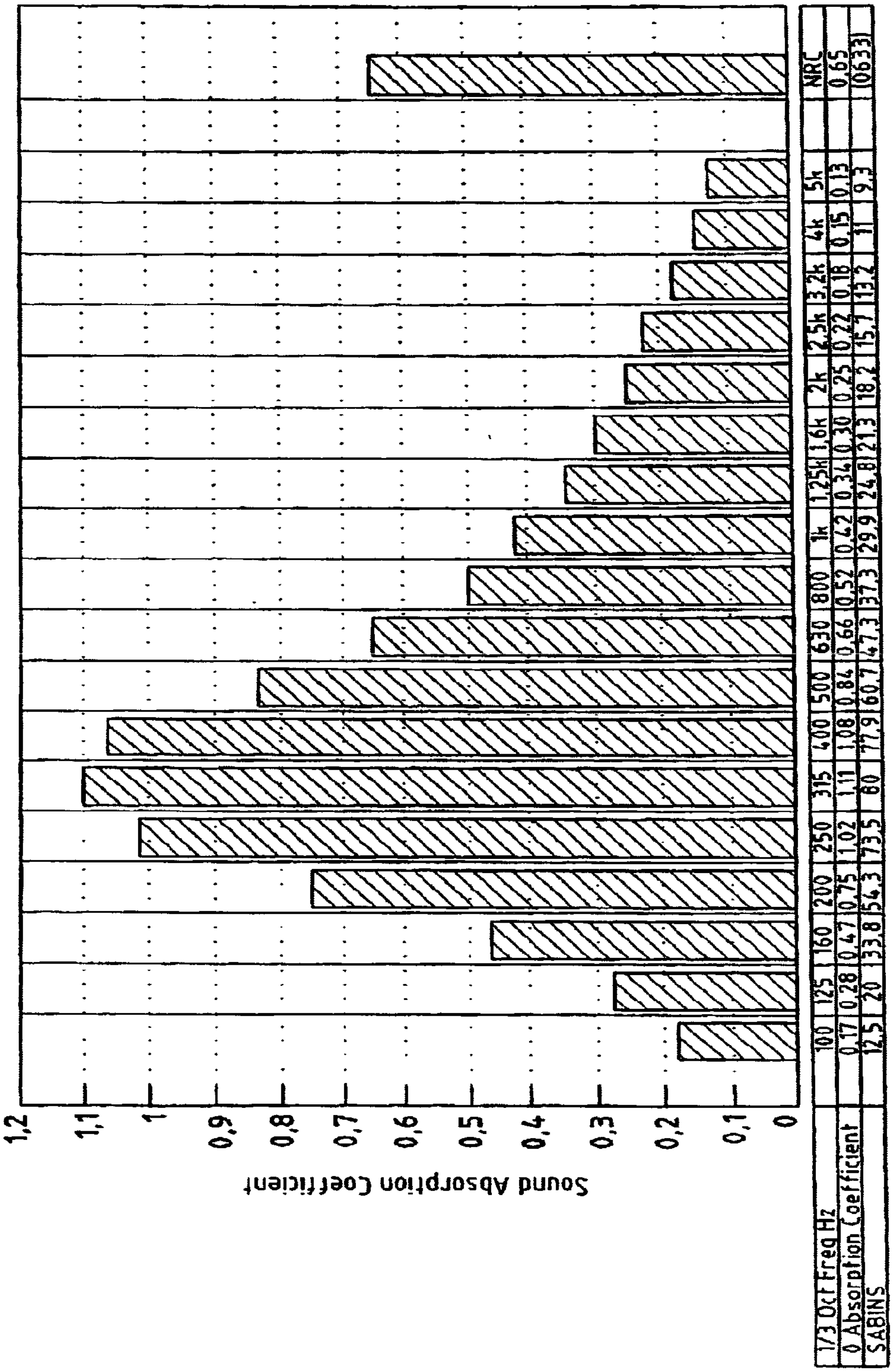
Figure 10:
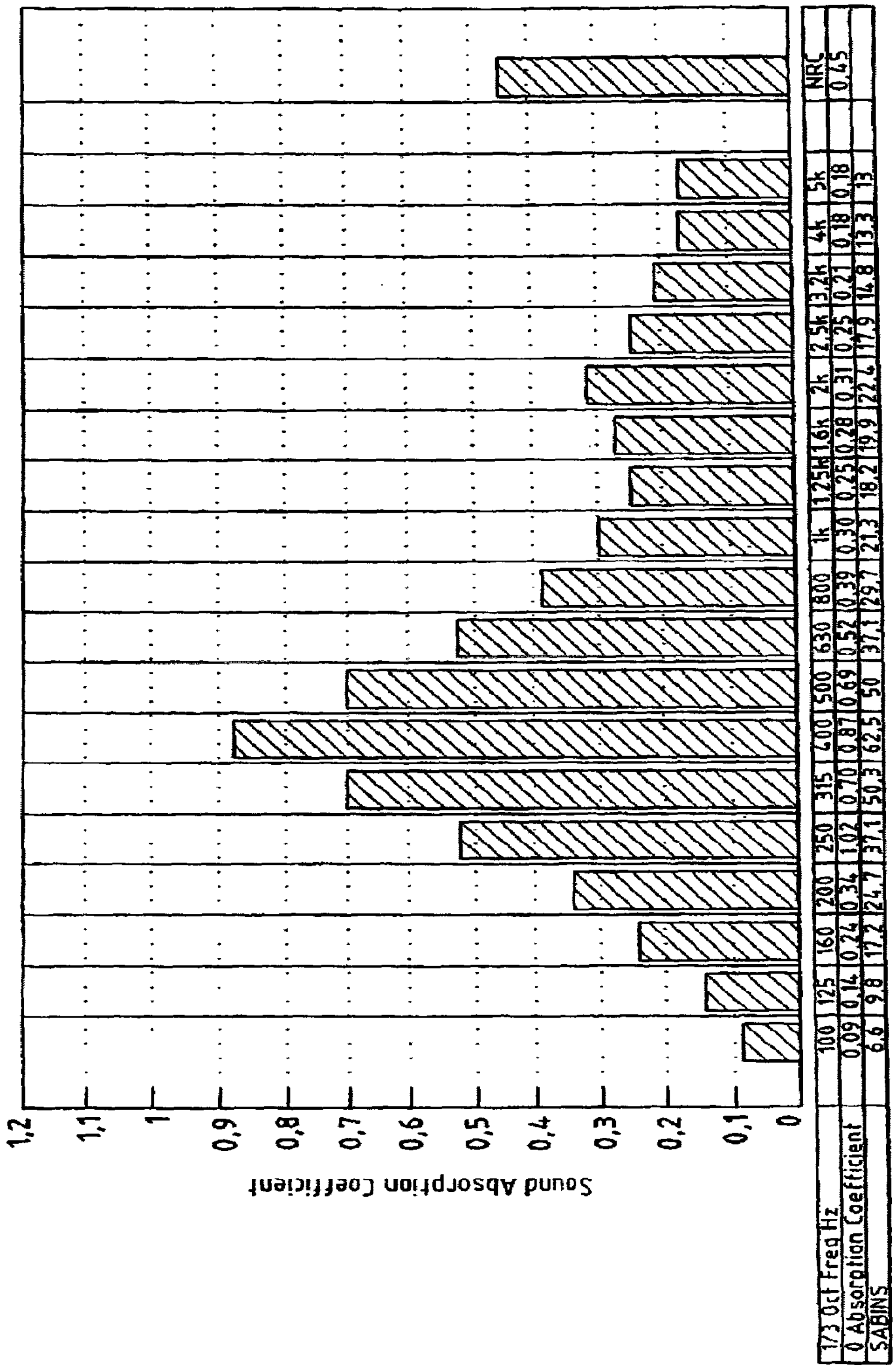

FIG. 4 is a graph analogous to FIG. 3 for experimental conditions 8, 8*b*, and 9, with the results obtained for conditions 1*b* and 2*b* being plotted on the FIG. 4 graph for comparison purposes;

FIG. 5 is a graph analogous to FIG. 2 for experimental condition 10, with the results obtained in tests 3 and 6 being plotted on the FIG. 5 graph for comparison purposes;

FIG. 6 is a graph analogous to FIG. 2 for experimental condition 11, with the results obtained for conditions 4 and 5 being plotted on the FIG. 6 graph for comparison purposes;

FIG. 7 is a graph analogous to FIG. 2, for experimental conditions 12, 13, and 14;

FIG. 8 is a histogram of sound absorption coefficient values as a function of one-third octave band frequencies for experimental conditions A;

FIG. 9 is a histogram analogous to FIG. 8 for experimental conditions B; and FIG. 10 is a histogram analogous to FIG. 8 for experimental conditions C.

Reference is made initially to FIG. 1.

Figure 1A:
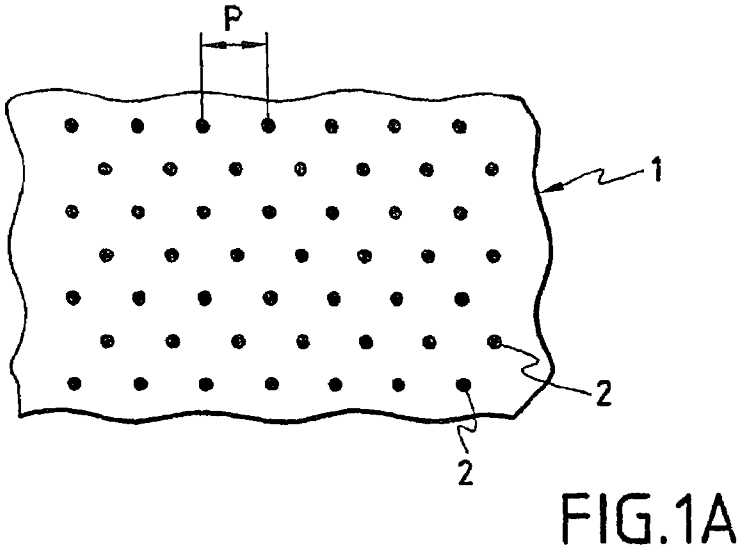
Figure 1B:
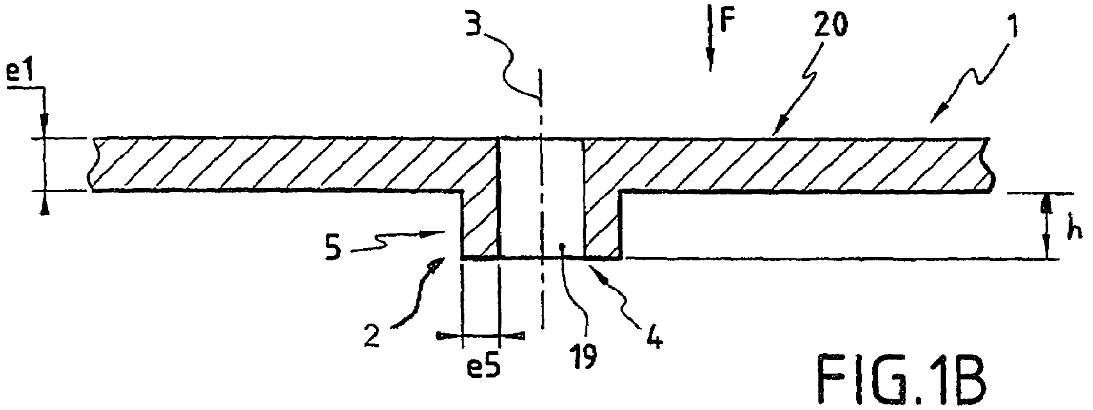

FIG. 1*a* is a face view of a material 1 that is about one-tenth of a millimeter thick, being provided with substantially identical microprojections 2 that are uniformly distributed in a square-mesh array. FIG. 1*b* is a greatly enlarged view showing the shape of such a projection 2 when seen in section perpendicular to the plane of FIG. 1. The dimensions of the micro-projections are such as to make them appear substantially as points in FIG. 1. In the embodiment shown here, these projections 2 are in the form of substantially circular depressions about an axis 3 perpendicular to the mean plane of the sheet of material 1 when laid out flat. These projections extend over a small height h that is of the order of a few microns (μm) to a few tens of microns, and they present a visible opening of the order of two-tenths of a millimeter.

In the embodiment shown, these microprojections have a perforated end wall 4. In a particular embodiment, these through holes 19 are the result of needling using needles whose tips have a diameter of the order of a few hundredths of a millimeter, e.g. four-hundredths of a millimeter.

In an implementation, the needling is performed while the sheet of material 1 is placed under tension. In a particular implementation, this tension is of the same order as that to which the sheet is subjected in use, e.g. as a tensioned false ceiling.

The through holes 19 having a diameter of the order of a few hundredths of a millimeter are obtained without removing any material.

The end walls 4 of the perforated microprojections 2 are connected to the edges of the depressions via annular walls 5 that are bodies of revolution about the corresponding axes 3. Where appropriate, these walls 5 can be of a thickness e5 that is less than the thickness e1 as measured in the sheet of material 1 away from the projections. This difference in thickness is more marked for increasing height h of the microprojections 2, for given thickness e1.

In certain particular embodiments (not shown) for at least a fraction of the projections 2, the annular wall 5 is discontinuous.

In a variant, the end walls of at least a fraction of the microprojections can be substantially solid, i.e. without any through holes.

By way of example, the following values can be implemented:

pitch p between microprojections: 1 mm;

density of microprojections per square centimeter ($cm^2$): 25; and height of projections: a few microns to 100 μm.

Other embodiments could be envisaged.

In a first type of variant, the projections are not all identical, with two or more than two populations of different projections being provided, said projections being different in shape.

In a second type of variant, possibly combined with the first type mentioned above, the projections are not all substantially in the form of points, but are elongate in at least one direction so as to form microfluting and microgrooves.

In a third type of variant, possibly combined with one or both of the above types, not all of the projections are circularly symmetrical about an axis substantially perpendicular to the mean plane of the sheet of material 1.

Thus, for example, the end walls of the depressions, when seen in plan view, could be square, rectangular, oval, or in the shape of an optionally regular polygon. The mesh of the array of microprojections in the embodiment shown in FIG. 1 is square. In other embodiments, the mesh need not be square but could be rectangular.

Figure 1C:
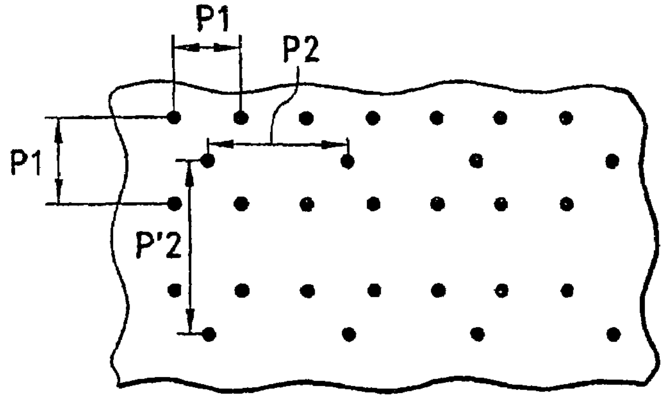

In certain embodiments, at least two arrays of microprojections having different meshes and/or pitches p1, p2, p'2 are disposed on the sheet of material 1, as shown in FIG. 1*c*.

Figure 1D:
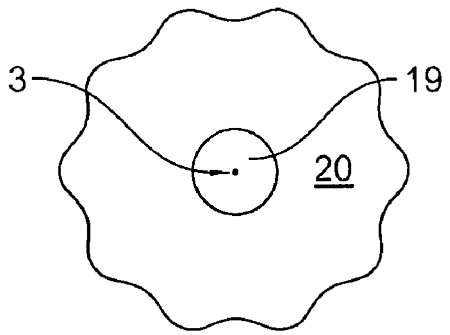

FIG. 1*d* is a top view of the perforated micro-relief 2 shown in FIG. 1*b*. From this top view, only the traversing hole 19 made through the visible face 20 of the sheet material 1 is seen. The traversing hole 19 is circularly symmetrical about the axis 3.

Figure 1E:
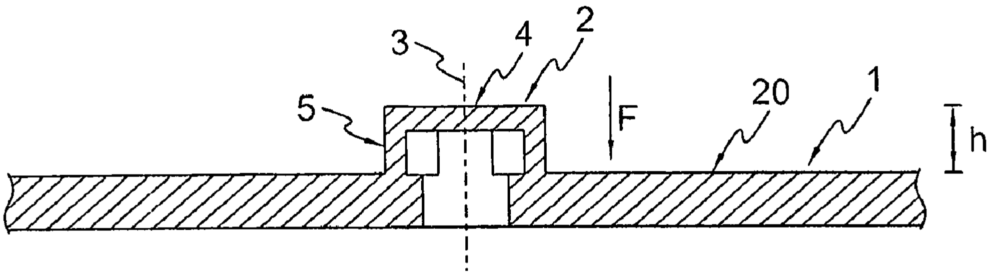

FIG. 1*e* is another sectional view, similar to FIG. 1*b*, in which the micro- relief is shown extending out of the visible face 19 of the sheet material 1. The annular wall 5 that connects the substantially plane bottom wall 4 to the sheet material is shown as being discontinuous.

Depending on the density of the microprojections, the pattern in which they are distributed, and their height, the inventors have found that the visual impact of providing such projections is more or less marked, as is the impact on the acoustic properties of the sheet of material 1, with it being possible to obtain a spectacular improvement in acoustic properties without any significant visual impact, the provision of micro-perforated microprojections turning out to be highly effective in acoustic terms and practically invisible. Thus while maintaining conventional appearance for the tensioned sheet, making it clearly different from suspended ceilings that are perforated or gridded, the invention makes it possible in particular to achieve acoustic properties that are analogous to those of anti-noise suspended ceilings.

In certain embodiments, as mentioned above, the sheet is provided with microprojections but is not perforated or microperforated. Providing micro-projections without perforations serve to improve the acoustic properties of the material without affecting its properties as a fluid-proof barrier. Compared with perforated sheets, possible traces of air passing through such as dark marks can also be avoided. Similarly, perforations with irregular edges as obtained when the perforation tool is worn can be avoided. The material is also easy to wash.

When a sheet of material provided with micro-perforations is seen looking along arrow F in FIG. 1*b*, the microperforations 19 do not perceptibly spoil its visual appearance. In particular, the inventors have found that the provision of microperforations 19 such as those shown in FIG. 1*b* is practically undetectable when combined with a mat finish for the visible face 20 of the sheet of material 1. The improved acoustic properties for the material make it possible to avoid installing any fiber insulation that can give rise to dust and micro-fibers that might have harmful effects on health.

The improvement obtained in the acoustic properties of sheets of material by providing microperforated microprojections is illustrated below with the help of various experimental results. In order to present these results, the following elements of acoustics need to be recalled insofar as these elements are not part of the knowledge of the person skilled in the art of tensioned sheet walls and ceilings.

Soundwaves are the result of pressure variations propagating in elastic media, in the form of wave fronts at a speed that depends, in a solid, on the modulus of elasticity and on the density of the solid (being 500 meters per second (m/s) in cork and 3100 m/s in ordinary concrete, for example). The spectrum audible to the human ear is formed by sound vibrations at frequencies lying in the range 16 hertz (Hz) to 20,000 Hz, providing such sounds are emitted at a sound pressure greater than a certain threshold (the threshold of audibility being equal to four phons). The frequency range of speech lies in the range about 10 Hz to about 10 kHz, with speech comprehension being concentrated on frequencies lying in the range 300 Hz to 3 kHz. The musical frequency range lies between about 16 Hz and 16 kHz, and one octave corresponds to a doubling in frequency.

| Instrument or voice | Low frequency (Hz) | High frequency (Hz) |
|---|---|---|
| Violin | 200 | 3000 |
| Piano | 30 | 4000 |
| Flute | 250 | 2500 |
| Cello | 70 | 800 |
| Double bass | 40 | 300 |
| Tuba | 50 | 400 |
| Trumpet | 200 | 1000 |
| Organ | 16 | 1600 |
| Bass | 100 | 350 |
| Baritone | 150 | 400 |
| Tenor | 150 | 500 |
| Alto | 200 | 800 |
| Soprano | 250 | 1200 |

Sounds can be absorbed by converting sound energy into deformation work or internal friction within a porous absorbent material having low acoustic impedance, or by using a resonator that dissipates the acoustic energy of sounds at frequencies close to the resonant frequencies of the resonator in the form of heat generated by internal friction. In conventional manner, four types of sound insulator are distinguished:

rigid porous materials such as porous concretes and rigid foams, in which the capillary networks provide acoustic resistance;

elastic porous materials such as minerals wools, felts, polystyrenes, in which acoustic energy is dissipated by solid friction;

materials exhibiting acoustic resonance, acting on the principle of Helmholtz resonators, such as perforated panels; and materials presenting mechanical resonance, operating on the basis of a damped oscillator.

A dimensionless sound absorption index $\alpha$ is defined such that the index $\alpha$ is the normalized difference between the incident and the reflected acoustic energy. This index is a function of the frequency of the incident sound. The attenuation of sound in air is a function of temperature, pressure, and relative humidity, so absorption index measurements must be performed at known temperature, pressure, and humidity (see French standard NF S 30 009). For standards relating to how to measure this index, reference can be made, for example, to the following documents: international standard ISO 354, French standards NF EN 20354, NF S 31 065, U.S. standard ASTM C423. The table below gives typical values of this sound absorption index $\alpha$.

| | $\alpha$ at 125 Hz | $\alpha$ at 500 Hz | $\alpha$ at 2000 Hz |
|---|---|---|---|
| Rendering on masonry | 0.02 | 0.02 | 0.03 |
| Lime rendering | 0.03 | 0.03 | 0.04 |
| Lightweight concrete | 0.07 | 0.22 | 0.10 |
| Mortar | 0.03 | 0.03 | 0.07 |
| 2.5 cm thick acoustic plate | | | |
| with 3 cm of air; | 0.25 | 0.23 | 0.74 |
| applied against a wall | 0.15 | 0.23 | 0.73 |
| 2 cm thick insulating panels applied | | | |
| against a wall | 0.13 | 0.19 | 0.24 |
| with 3 cm of air | 0.15 | 0.23 | 0.23 |
| with 3 cm of glass wool | 0.33 | 0.44 | 0.37 |
| Wooden door | 0.14 | 0.08 | 0.10 |
| Wooden flooring | 0.05 | 0.06 | 0.10 |
| 3 mm thick plywood plus 2 cm of air | 0.07 | 0.22 | 0.10 |
| 3 mm thick plywood on a wall | 0.07 | 0.05 | 0.10 |

in similar manner, a sound reflection index $\rho$ is also defined, as are a sound dissipation index $\delta$ and a sound transmission index $\tau$.

At the interface between two media, the principle of sound energy conservation means that:

$$\rho+\tau+\delta=1,\ \rho+\alpha=1$$

The greater the amount of acoustic energy dissipated by an acoustic insulator, the smaller the amount of acoustic energy that is reflected, thereby reducing the echo effect.

Echo or reverberation due to sound being reflected on an obstacle gives rise to interference which can greatly increase the sound level in premises and make conversation difficult to follow.

For such reverberation, a reverberation time T is defined using the Sabine formula:

$$T=0.163\ V/\alpha A$$

where V is the volume of empty space; A is the absorbing area; and $\alpha$ is the absorption index as defined above.

The Sabine formula is established on the basis of the assumption that the reverberating field is distributed entirely uniformly. Reverberation time is the length of time required for acoustic energy to decrease by 60 decibels (dB), i.e. to 1 part per million (ppm) compared with its initial value.

Now that these notions of acoustics have been summarized, there follow various experimental results obtained under standardized conditions.

In a first series of tests, twelve strips of material were subjected to acoustic absorption testing.

The sheets of material had dimensions of 9 feet by 8 feet (9'×8') were fixed on the surface of a parallelepipedal box of glass wool having a wall thickness of three-quarters of an inch (¾"), and dimensions of 9'×8'×4', the box being stood on a plate of corrugated steel.

The glass wool box was removed from the reverberation chamber for "empty chamber" measurements. The results of the tests are given in Table I below.

The frequencies given in Table I are the standardized one-third octave band center frequencies.

TABLE I

| | First test series | | | | | | | | | | | |
|---|---|---|---|---|---|---|---|---|---|---|---|---|
| Frequences (Hz) | Test 1b | Test 2b | Test 3 | Test 4 | Test 5 | Test 6 | Test 7 | Test 8 | Test 9 | Test 10 | Test 11 | Test 8b |
| 125 | 0.43 | 0.71 | 0.77 | 0.77 | 0.37 | 0.43 | 0.47 | 0.80 | 0.46 | 0.33 | 0.42 | 0.90 |
| 160 | 0.31 | 0.70 | 0.68 | 0.60 | 0.43 | 0.45 | 0.49 | 0.97 | 0.59 | 0.61 | 0.59 | 1.01 |
| 200 | 0.18 | 0.69 | 0.69 | 0.66 | 0.41 | 0.41 | 0.40 | 0.89 | 0.42 | 0.49 | 0.55 | 0.93 |
| 250 | 0.21 | 0.63 | 0.73 | 0.72 | 0.49 | 0.51 | 0.43 | 0.88 | 0.51 | 0.63 | 0.61 | 0.97 |
| 315 | 0.29 | 0.79 | 0.87 | 0.88 | 0.68 | 0.73 | 0.65 | 0.90 | 0.70 | 0.79 | 0.75 | 0.94 |
| 400 | 0.39 | 0.87 | 1.00 | 1.03 | 0.81 | 0.83 | 0.70 | 0.82 | 0.76 | 0.83 | 0.83 | 0.76 |
| 500 | 0.41 | 0.82 | 1.02 | 1.03 | 0.82 | 0.85 | 0.70 | 0.75 | 0.74 | 0.92 | 0.93 | 0.69 |
| 630 | 0.39 | 0.73 | 0.98 | 0.99 | 0.87 | 0.87 | 0.68 | 0.69 | 0.69 | 0.91 | 0.90 | 0.65 |
| 800 | 0.37 | 0.69 | 1.00 | 1.00 | 0.93 | 0.93 | 0.67 | 0.68 | 0.68 | 0.94 | 0.93 | 0.67 |
| 1000 | 0.34 | 0.61 | 1.01 | 1.00 | 0.97 | 0.99 | 0.61 | 0.63 | 0.60 | 0.95 | 0.93 | 0.67 |
| 1250 | 0.35 | 0.58 | 1.06 | 1.06 | 1.02 | 1.04 | 0.59 | 0.61 | 0.57 | 1.01 | 1.00 | 0.62 |
| 1600 | 0.37 | 0.56 | 1.09 | 1.09 | 1.05 | 1.07 | 0.54 | 0.57 | 0.53 | 1.02 | 1.00 | 0.59 |
| 2000 | 0.35 | 0.48 | 1.08 | 1.04 | 1.07 | 1.07 | 0.50 | 0.50 | 0.44 | 0.97 | 0.97 | 0.52 |
| 2500 | 0.34 | 0.43 | 1.07 | 1.01 | 1.07 | 1.07 | 0.44 | 0.43 | 0.34 | 0.91 | 0.88 | 0.49 |
| 3150 | 0.30 | 0.36 | 1.01 | 0.91 | 1.01 | 1.01 | 0.38 | 0.36 | 0.24 | 0.76 | 0.70 | 0.45 |
| 4000 | 0.27 | 0.32 | 0.93 | 0.78 | 0.97 | 0.98 | 0.37 | 0.33 | 0.10 | 0.57 | 0.46 | 0.43 |
| AAC | 0.35 | 0.65 | 0.95 | 0.95 | 0.85 | 0.85 | 0.55 | 0.70 | 0.55 | 0.85 | 0.85 | 0.70 |

Table II is a summary of the corresponding test conditions.

TABLE II

| Experimental conditions for the first test series | | | | |
|---|---|---|---|---|
| Test number | Type of sheet | Support | Coaling of Sona Spray Acoustical Finish from from K13 Spray-On Systems | Glass fiber from Owens Corning on steel sheet |
| 1b | Smooth | Steel plate | No | No |
| 2b | Smooth | Steel plate | No | 6" R19 |
| 3 | Perforated NLM41 | Steel plate | No | 6" R19 |
| 4 | Perforated NL601 | Steel plate | No | 6" R19 |
| 5 | Perforated NL601 | Steel plate | 1" | No |
| 6 | Perforated NLM41 | Steel plate | 1" | No |
| 7 | Smooth | Steel plate | 1" | No |
| 8 | Smooth | — | No | 6" R19, at 3" from tie sheet |
| 8b | Smooth | — | No | 3-⅞" RA24 (1.5 #) at 5.75" from the sheet |
| 9 | Smooth | Steel plate | 2, 25" | No |
| 10 | Perforated NLM41 | Steel plate | 2, 25" | No |
| 11 | Perforated NL601 | Steel plate | 2, 25" | No |

The "perforated NLM41" sheets were of the type sold by the Applicant under the reference NewLine NLM41. Those sheets have perforations of large dimensions (circular holes with a diameter of 4 mm), obtained by removing material, with the density of the holes being less than 1 per square centimeter. The circular holes are to enable the plenum to be ventilated and smoke, if any, to be removed: this range of NLM41 products has the N1/B1/Fire 1 classification.

The "perforated NL601" sheets were of the type sold by the Applicant under the reference NewLine NL601. Those sheets are likewise provided with perforations of large size (circular holes having a diameter of 1 millimeter), which perforations are obtained by removing material. Like the holes in NLM41 sheets, these circular holes are intended to enable the plenum to be ventilated and any smoke to be removed, this NL601 range of products having the M1/B1/Fire 1 classification.

Curves corresponding to the above results are given in FIGS. 2 to 7:

FIG. 2 gives the results for tests 1*b*, 2*b*, 3, 4 compared with five values obtained with a reference;

FIG. 3 gives the results for tests 5, 6, and 7 relative to said reference;

FIG. 4 is a graph combining the results of tests 8, 8*b*, and 9, compared with those obtained in tests 1*b*, 2*b*, and 7;

FIG. 5 is a graph showing the results obtained for test 10, as compared with tests 3 and 6; and FIG. 6 is a graph showing the results obtained for test 11, compared with those obtained for tests 4 and 5.

Comparing curves 1*b* and 2*b* shows the impact of installing conventional fiber acoustic insulation, as can be done in the plenum.

Comparing curves 3 and 4 with curves 1*b* and 2*b* shows that perforating the tensioned sheet serves to increase the acoustic absorption properties thereof, in particular at high frequencies, a range in which installing fiber insulation turns out to have little effect. The inventors have sought an explanation for this observation. It turns out that in acoustics, it is known that a rigid perforated panel of thickness h situated at a distance e from a wall and having n cylindrical perforations of radius a, said panel being supported by four orthogonal battens, presents maximum effectiveness at an angular frequency given by:

$$\omega=c(n\pi/a^2e(h+8a/3\pi))^{1/2}$$

the panel behaving like a set of Helmholtz resonators with its maximum acoustic absorption value depending on the value of the damping coefficient and the perforation density. That type of mechanism is used in perforated suspended ceilings.

With the tensioned sheets under consideration herein, the sheets of tensioned material can vibrate so they are therefore neither rigid nor undeformable, and in addition the thickness h is very small compared with the thickness of acoustic insulating panels, such that the above model is not suitable. Other models known in the field of acoustics seek to predict the behavior of panels comprising perforated diaphragms, taking account of the stiffness specific to the panel and the compression of the air behind the panel, and also how air flows through the perforations since that can have a dissipating effect.

Those highly complex models might possibly apply to the results obtained during steps 3, 4, 5, 6, 10, and 11.

Curves 5, 6, and 7 illustrate the impact of using a spray acoustical finish on the tensioned sheets. The effect of this finish is particularly marked at high frequencies. Conversely, as shown in FIG. 4, for a smooth tensioned sheet, installing fibrous insulation (tests 2*b*, 8, 8*b*) or applying a spray acoustical finish (tests 7 and 9) gives results at frequencies above 400 Hz that are inferior to those obtained using perforated sheets with or without a spray acoustical finish. In all of the configurations shown by tests 1*b*, 2*b*, 3, 4, 5, 6, 7, 8, 8*b*, 9, 10, and 11, the acoustic attenuation properties are highly asymmetrical below low frequencies and high frequencies.

Unexpectedly, and without being able to give any simple explanation, the inventors have found that making microprojections and microperforations gives rise to results that are just as favorable as making perforations of large size. Indeed, the results obtained with micro-perforations are better in the high frequency range than those obtained with perforations of large size.

Tests 12, 13, and 14 illustrate these surprising results. Test conditions were as follows: temperature=70° F. (about 21.2° C.), humidity=64%, pressure=atmospheric. A 9'×8' microperforated sheet of material was tested in an E 1219 type setup. The term "micro-perforated" is used herein, with reference to tests 12, 13, and 14, to mean a sheet of PVC material having a thickness of 17 hundredths of a millimeter and provided with microperforations formed by needling, without removing any material, the needles used have a tip diameter of about 4 hundredths of a millimeter, the density of the resulting microperforations being about twenty-three per square centimeter, the perforations being distributed in a mesh of the kind shown in FIG. 1*a*. The sheet was tensioned on the top face of an unpainted parallelepipedal box having a ¾ thick wall of glass fibers, and a volume of 10,154.72 cubic feet (cu.ft). The "empty chamber" results were obtained without using the box, the sheet of material being placed on a steel plate. For empty chamber testing, the values T60 correspond to average reverberation times. The acoustic absorption coefficient (AAC) and the results were obtained in application of United States standard ASTM C423-90a. The noise reduction coefficient (NRC) and AAC values were obtained in application of the standard ASTM C423. For test 12, a 6" thick layer of glass wool R19 from Owens Corning was suspended in the box, at 3.75" from the sheet of tensioned material. For test 13, a 1" thick layer of RA24 glass fiber from Owens Corning was suspended in the box at 8.75" from the sheet of tensioned material. For test 14, no material was placed in the box.

taken into account so as to make them comparable with the presentation of the graphs of FIGS. 2 to 6.

Combining a microperforated membrane with fiber insulation placed at a distance from the rigid wall makes it possible to obtain acoustic attenuation that is uniform over the entire range of frequencies under consideration.

The tests performed for the first and second series mentioned above made use of an acoustic chamber having walls made of glass fiber, and that does not correspond to the real situation for tensioned ceilings.

TABLE III

Tests Nos. 12, 13, and 14.
Acoustic absorption measurements using a reverberation chamber

| Freq. (Hz) | Empty chamber T60 (s) | Uncert. % | Test 14 T60 (s) | Uncert. % | AAC | Margin sabins/ sq. ft | Test 13 T60 (s) | Uncert. % | AAC | Margin sabins/ Sq ft | Test 12 T60 (s) | Uncert. % | AAC | Margin sabins/ Sq. ft |
|---|---|---|---|---|---|---|---|---|---|---|---|---|---|---|
| 50 | 1.63 | 5 | 1.31 | 3.23 | 0.76 | 0.26 | 1.37 | 2.59 | 0.52 | 0.28 | 1.88 | 15.29 | 0.84 | 0.61 |
| 63 | 1.37 | 7.58 | 0.96 | 4.48 | 2.15 | 0.50 | 0.90 | 3.25 | 2.59 | 0.46 | 1.01 | 4.81 | 1.80 | 0.50 |
| 80 | 1.60 | 5.44 | 1.17 | 14.97 | 1.61 | 0.92 | 1.12 | 6.42 | 1.88 | 0.48 | 1.15 | 4.52 | 1.71 | 0.36 |
| 100 | 2.40 | 5.74 | 2.21 | 6.64 | 0.24 | 0.32 | 1.96 | 9.18 | 0.64 | 0.36 | 1.70 | 2.44 | 1.17 | 0.19 |
| 125 | 3.16 | 2.37 | 2.81 | 3.90 | 0.27 | 0.11 | 2.57 | 3.86 | 0.51 | 0.12 | 2.37 | 2.67 | 0.73 | 0.09 |
| 160 | 3.56 | 3.22 | 3.06 | 1.99 | 0.32 | 0.08 | 2.63 | 1.95 | 0.69 | 0.08 | 2.56 | 4.01 | 0.76 | 0.13 |
| 200 | 4.01 | 2.53 | 3.55 | 2.31 | 0.22 | 0.08 | 2.94 | 2.38 | 0.63 | 0.07 | 2.58 | 2.07 | 0.96 | 0.07 |
| 250 | 5.62 | 1.34 | 4.37 | 2.16 | 0.35 | 0.04 | 3.45 | 2.53 | 0.77 | 0.05 | 3.18 | 2.06 | 0.94 | 0.05 |
| 315 | 6.67 | 1.77 | 5.02 | 1.43 | 0.34 | 0.03 | 3.81 | 1.58 | 0.78 | 0.03 | 3.54 | 1.19 | 0.91 | 0.03 |
| 400 | 6.25 | 0.90 | 4.53 | 1.65 | 0.42 | 0.03 | 3.64 | 1.62 | 0.80 | 0.03 | 3.39 | 1.77 | 0.93 | 0.04 |
| 500 | 7.05 | 0.62 | 4.82 | 1.08 | 0.45 | 0.03 | 3.93 | 1.28 | 0.78 | 0.02 | 3.85 | 1.43 | 0.81 | 0.03 |
| 630 | 7.23 | 0.73 | 4.85 | 1.29 | 0.47 | 0.02 | 3.99 | 1.44 | 0.78 | 0.03 | 3.95 | 1.43 | 0.79 | 0.03 |
| 800 | 7.23 | 0.41 | 4.65 | 1.01 | 0.53 | 0.02 | 3.89 | 0.71 | 0.82 | 0.01 | 3.87 | 0.84 | 0.83 | 0.02 |
| 1000 | 7.17 | 0.45 | 4.47 | 1.06 | 0.58 | 0.02 | 3.85 | 0.59 | 0.83 | 0.01 | 3.88 | 0.93 | 0.82 | 0.02 |
| 1250 | 6.92 | 0.45 | 4.17 | 0.55 | 0.66 | 0.01 | 3.72 | 0.51 | 0.86 | 0.01 | 3.70 | 0.52 | 0.87 | 0.01 |
| 1600 | 6.25 | 0.34 | 3.83 | 0.61 | 0.70 | 0.01 | 3.50 | 0.49 | 0.87 | 0.01 | 3.49 | 0.61 | 0.88 | 0.01 |
| 2000 | 5.29 | 0.43 | 3.45 | 0.73 | 0.70 | 0.02 | 3.21 | 0.47 | 0.85 | 0.01 | 3.21 | 0.52 | 0.85 | 0.01 |
| 2500 | 4.06 | 0.49 | 2.90 | 0.41 | 0.68 | 0.01 | 2.76 | 0.42 | 0.80 | 0.01 | 2.76 | 0.59 | 0.81 | 0.02 |
| 3150 | 3.37 | 0.57 | 2.54 | 0.59 | 0.57 | 0.02 | 2.45 | 0.40 | 0.78 | 0.02 | 2.44 | 0.48 | 0.78 | 0.02 |
| 4000 | 2.80 | 0.48 | 2.23 | 0.46 | 0.63 | 0.02 | 2.17 | 0.36 | 0.72 | 0.02 | 2.17 | 0.48 | 0.72 | 0.02 |
| 5000 | 2.20 | 0.55 | 1.85 | 0.50 | 0.59 | 0.03 | 1.82 | 0.40 | 0.66 | 0.02 | 1.80 | 0.48 | 0.69 | 0.03 |
| 6300 | 1.67 | 0.38 | 1.48 | 0.44 | 0.54 | 0.03 | 1.45 | 0.39 | 0.62 | 0.02 | 1.43 | 0.44 | 0.68 | 0.03 |
| 8000 | 1.21 | 0.53 | 1.11 | 0.50 | 0.50 | 0.04 | 1.09 | 0.68 | 0.58 | 0.05 | 1.08 | 0.60 | 0.65 | 0.05 |
| 10000 | 0.89 | 0.78 | 0.83 | 0.85 | 0.51 | 0.09 | 0.83 | 0.61 | 0.58 | 0.08 | 0.82 | 0.64 | 0.70 | 0.08 |

The values obtained for AAC and NRC are given in Table IV below.

TABLE IV

Test Nos. 12, 13, and 14, values obtained for NRC and AAC

| | NRC | AAC |
|---|---|---|
| Test 12 | 0.85 | 0.87 |
| Test 13 | 0.8 | 0.8 |
| Test 14 | 0.5 | 0.51 |

The acoustic absorption values obtained during tests 12, 13, and 14 are plotted on the graph of FIG. 7, with only frequencies lying in the range 125 Hz to 4000 Hz being In order to obtain a better evaluation of the impact of the presence of the support for the tensioned sheet on the acoustic attenuation properties of the entire assembly, a third series of tests was performed under the following conditions.

Test A

8'×9' panels of glass fibers having a total weight of 0.25 pounds per square foot (psf), thickness of 1" (density 3 lb/cu.ft) surrounded by a tubular metal frame having a height of 4" and a nominal thickness of 1½ were fixed directly on the base wall of the reverberation chamber (setup A in the standard ASTM E 795).

Those frames constituted supports for tips of smooth tensioned PVC material.

Test B

8'×9' panels of smooth PVC (5 thousandths of an inch (mil)) were placed using a barb/rail mount at 4" from the end wall of the reverberation chamber (E90 setup of the standard ASTM E 795).

The frame supporting the smooth PVC panels was of metal tubes having a height of 4" and a nominal thickness of 1½.

The frame was fixed on the outside to the base wall of the reverberation chamber.

A 2" thick glass fiber panel (density 3 lb/cu.ft) was placed directly on the end wall of the chamber.

The total weight of the glass fiber panel was 0.49 psf, with the PVC strip weighing 0.05 psf.

Test C

8'×9' panels of smooth (5 mil) PVC were placed using a barb/rail mount at 4" from the end wall of the reverberation chamber (E90 setup of the standard ASTM E 795).

The support frame for the smooth PVC panels was made of metal tubes having a height of 4" and a nominal thickness of 1½.

The frame was fixed on the outside to the base wall of the reverberation chamber.

A 1" thick (density 3 lb/cu.ft) glass fiber panel was placed directly on the end wall of the chamber.

The total weight of the glass fiber panel was 0.25 psf, the PVC strip weighing 0.05 psf.

The results obtained are given in Table V below.

TABLE V

Results obtained for tests A, B, and C

| | Acoustic absorption coefficient Test A | Sabins Test A | Acoustic absorption coefficient Test B | Sabins Test B | Acoustic absorption coefficient Test C | Sabins Test C |
|---|---|---|---|---|---|---|
| 100 | 0.05 | 3.6 | 0.17 | 12.5 | 0.09 | 6.6 |
| 125 | 0.07 | 5.3 | 0.28 | 20.0 | 0.14 | 9.8 |
| 160 | 0.12 | 8.3 | 0.47 | 33.8 | 0.24 | 17.2 |
| 200 | 0.21 | 15.3 | 0.75 | 54.3 | 0.34 | 24.7 |
| 250 | 0.30 | 21.6 | 1.02 | 73.5 | 0.52 | 37.1 |
| 315 | 0.45 | 32.6 | 1.11 | 80.0 | 0.70 | 50.3 |
| 400 | 0.66 | 47.5 | 1.08 | 77.9 | 0.87 | 62.5 |
| 500 | 0.69 | 49.6 | 0.84 | 60.7 | 0.69 | 50.0 |
| 630 | 0.71 | 50.9 | 0.66 | 47.3 | 0.52 | 37.1 |
| 800 | 0.72 | 52.0 | 0.52 | 37.3 | 0.39 | 27.9 |
| 1000 | 0.74 | 53.3 | 0.42 | 29.9 | 0.30 | 21.3 |
| 1250 | 0.78 | 56.4 | 0.34 | 24.8 | 0.25 | 18.2 |
| 1600 | 0.83 | 60.1 | 0.30 | 21.3 | 0.28 | 19.9 |

TABLE V-continued

Results obtained for tests A, B, and C

| | Acoustic absorption coefficient Test A | Sabins Test A | Acoustic absorption coefficient Test B | Sabins Test B | Acoustic absorption coefficient Test C | Sabins Test C |
|---|---|---|---|---|---|---|
| 2000 | 0.87 | 62.6 | 0.25 | 18.2 | 0.31 | 22.4 |
| 2500 | 0.92 | 65.9 | 0.22 | 15.7 | 0.25 | 17.9 |
| 3150 | 0.94 | 67.7 | 0.18 | 13.2 | 0.21 | 14.8 |
| 4000 | 0.98 | 70.2 | 0.15 | 11.0 | 0.18 | 13.3 |
| 5000 | 1.01 | 72.5 | 0.13 | 9.3 | 0.18 | 13.0 |

The NRC and mean NRC values obtained for tests A, B, and C are given in Table VI below.

TABLE VI

NRC values obtained for tests A, B, and C

| | Test A | Test B | Test C |
|---|---|---|---|
| NRC Moyen | 0.65 | 0.633 | 0.455 |
| NRC | 0.65 | 0.65 | 0.45 |

The values for the acoustic absorption coefficients were obtained using the terms of standard ASTM C 423-90a using a Bruel Kjaer type 2133 analyzer.

The histograms of FIGS. 8, 9, and 10 show how the acoustic absorption coefficients vary with frequency for frequencies lying in the range 100 Hz to 5000 Hz for tests A, B, and C.

The flexible sheet polymer material having improved acoustic properties as described above is suitable for use in tensioned decorative or masking structures, such as those constituting false ceilings or false walls, in particular.

The material can also be used for display panels, whether of the fixed type or of the moving type, with the attenuation in reverberation making it possible to reduce the sound nuisance that is generated by such panels.

Since the visual appearance of the material is not significantly altered by making the microprojections, the material remains entirely suited for use in industrial premises and in hospitals, and also for use in public buildings or in recent or historic dwellings.

The acoustic properties obtained using these materials are entirely comparable with those obtained using conventional suspended ceilings, as can be seen from the following table, given by way of indication.

TABLE VII

Comparison of the acoustic properties of a microperforated sheet of the invention with conventional ceiling plates

| Product | 125 Hz | 250 Hz | 500 Hz | 1000 Hz | 2000 Hz | 4000 Hz | AAC |
|---|---|---|---|---|---|---|---|
| Suspended ceiling plate a (Armstrong) | 0.23 | 0.32 | 0.40 | 0.87 | 0.74 | 0.83 | 0.55 |
| Suspended ceiling plate b (Armstrong) | 0.34 | 0.32 | 0.40 | 0.64 | 0.71 | 0.76 | 0.55 |
| Suspended ceiling plate c (Armstrong) | 0.33 | 0.31 | 0.53 | 0.68 | 0.62 | 0.52 | 0.55 |
| New Mat microperforated tensioned sheet (test 14) | 0.27 | 0.35 | 0.45 | 0.58 | 0.70 | 0.63 | 0.50 |

The invention claimed is:

1. A tensioned structure comprising a flexible sheet of material having a thickness less than half a millimeter and tensioned relative to a support means;

the material including microprojections formed by displacing the material from which it is made, said material presenting an acoustic absorbtion coefficient which is higher than that of the same material without said projections;

the height (h) of the microprojections measured in a direction perpendicular to the plane of said sheet in the vicinity of said microprojections is less than three times the thickness of said sheet;

the microprojections project from both faces of said sheet;

each microprojection is located at a node of a regular pattern;

all of the microprojections are disposed at the nodes of a single pattern;

the pattern has a square mesh;

the microprojections are in the form of depressions having a substantially plane end wall connected to an opening via a strip of material of thickness that is smaller than or equal to the thickness of portions of the sheet between the microprojections;

the depressions are circularly symmetrical about respective axes that are substantially perpendicular to their end walls;

the strip of material connecting the end wall of a depression to its opening is discontinuous;

it is provided with microperforations, having openings smaller than four-tenths of a millimeter;

at least a fraction of the microprojections are provided with said microperforations or said microperforations are disposed between the microprojections.

2. A tensioned structure comprising a flexible sheet of material having a thickness less than half a millimeter and tensioned relative to support means;

the material including microprojections formed by displacing the material from which it is made, said material presenting an acoustic absorption coefficient which is higher than that of the same material without said projections, wherein the microprojections are in the form of depressions having a substantially plane end wall connected to an opening via a strip of material of thickness that is smaller than or equal to the thickness of portions of the sheet between the microprojections, wherein the depressions are circularly symmetrical about respective axes that are substantially perpendicular to their end walls.

3. The tensioned structure according to claim 2, wherein the strip of material connecting the end wall of a depression to its opening is discontinuous.

* * * * *